United States Patent [19]
Violante et al.

[11] Patent Number: 5,765,106
[45] Date of Patent: Jun. 9, 1998

[54] AUTHORIZED CELLULAR TELEPHONE COMMUNICATION ACCESS AND VERIFICATION CONTROL SYSTEM

[75] Inventors: Anthony F. Violante, Stratford; Ronald P. Sansone, Weston, both of Conn.

[73] Assignee: Pitney Bowes Inc., Stamford, Conn.

[21] Appl. No.: 577,789

[22] Filed: Dec. 22, 1995

[51] Int. Cl.[6] .................................................. H04Q 7/38
[52] U.S. Cl. ........................ 455/410; 455/403; 455/411; 379/189; 379/161; 379/168
[58] Field of Search ............................... 455/410, 466, 455/403, 411, 412, 415, 558; 379/168, 173, 174, 169, 189, 161; 380/28, 19, 23

[56] References Cited

U.S. PATENT DOCUMENTS

| | | |
|---|---|---|
| 3,255,439 | 6/1966 | Simjian . |
| 3,428,948 | 2/1969 | Simjian . |
| 3,501,744 | 3/1970 | Simjian . |
| 3,716,698 | 2/1973 | Simjian . |
| 3,792,446 | 2/1974 | McFiggins et al. . |
| 3,890,599 | 6/1975 | Simjian . |
| 3,977,222 | 8/1976 | Luperti et al. . |
| 3,998,079 | 12/1976 | Uthenwoldt . |
| 4,097,923 | 6/1978 | Eckert, Jr. et al. . |
| 4,122,532 | 10/1978 | Dlugos et al. . |
| 4,138,735 | 2/1979 | Allocca et al. . |
| 4,218,011 | 8/1980 | Simjian . |
| 4,222,518 | 9/1980 | Simjian . |
| 4,226,360 | 10/1980 | Simjian . |
| 4,249,071 | 2/1981 | Simjian . |
| 4,258,252 | 3/1981 | Simjian . |
| 4,268,817 | 5/1981 | Simjian . |
| 4,317,028 | 2/1982 | Simjian . |
| 4,376,299 | 3/1983 | Rivest . |
| 4,436,992 | 3/1984 | Simjian . |
| 4,447,890 | 5/1984 | Duwel et al. . |
| 4,787,045 | 11/1988 | Storace et al. . |
| 4,811,234 | 3/1989 | Storace . |
| 4,812,992 | 3/1989 | Storace . |
| 4,827,508 | 5/1989 | Shear . |
| 4,864,506 | 9/1989 | Storace . |
| 4,977,594 | 12/1990 | Shear . |
| 5,010,571 | 4/1991 | Katznelson . |
| 5,050,213 | 9/1991 | Shear . |
| 5,051,564 | 9/1991 | Schmidt . |
| 5,058,025 | 10/1991 | Haines et al. . |
| 5,060,266 | 10/1991 | Dent ............................. 455/466 |
| 5,077,660 | 12/1991 | Haines . |
| 5,136,648 | 8/1992 | Olsen et al. . |
| 5,224,046 | 6/1993 | Kim et al. . |
| 5,233,531 | 8/1993 | Schultz . |
| 5,237,506 | 8/1993 | Horbal et al. . |
| 5,237,612 | 8/1993 | Raith ............................. 455/466 |
| 5,239,294 | 8/1993 | Flanders et al. . |
| 5,243,654 | 9/1993 | Hunter . |
| 5,247,575 | 9/1993 | Sprague et al. . |
| 5,282,250 | 1/1994 | Dent et al. . |
| 5,291,543 | 3/1994 | Freese et al. . |
| 5,301,223 | 4/1994 | Amadon et al. . |
| 5,301,234 | 4/1994 | Mazziotto et al. . |
| 5,309,363 | 5/1994 | Graves et al. . |
| 5,309,501 | 5/1994 | Kozik et al. . |
| 5,319,705 | 6/1994 | Halter et al. . |
| 5,325,418 | 6/1994 | McGregor et al. . |
| 5,329,573 | 7/1994 | Chang et al. . |
| 5,335,278 | 8/1994 | Matchett et al. . |
| 5,369,401 | 11/1994 | Haines . |
| 5,377,264 | 12/1994 | Lee et al. . |
| 5,377,267 | 12/1994 | Suzuki et al. . |
| 5,377,268 | 12/1994 | Hunter . |
| 5,388,212 | 2/1995 | Grube et al. ........................ 455/466 |
| 5,394,469 | 2/1995 | Nagel et al. . |
| 5,455,863 | 10/1995 | Brown et al. ........................ 455/466 |
| 5,457,737 | 10/1995 | Wen ..................................... 455/466 |
| 5,594,794 | 1/1997 | Alanara et al. ...................... 380/28 |

*Primary Examiner*—Dwayne D. Bost
*Assistant Examiner*—Keith Ferguson
*Attorney, Agent, or Firm*—Ronald Reichman; Melvin J. Scolnick; Robert Meyer

[57] ABSTRACT

This invention relates to a cellular telecommunications systems that utilizes encryption and employs encrypted seed number signals to make it more difficult to make unauthorized cellular telephone calls.

11 Claims, 6 Drawing Sheets

AUTHORIZED CELLULAR TELEPHONE COMMUNICATION ACCESS AND VERIFICATION CONTROL SYSTEM

CROSS REFERENCE TO RELATED APPLICATIONS

Reference is made to commonly assigned copending patent application Docket No. 08/577,312 filed herewith entitled "Authorized Cellular Telephone Communication Payment Refill System" in the names of Anthony F. Violante and Ronald P. Sansone and Docket No. 08/577,567 filed herewith entitled "Authorized Cellular Voice Messaging And/Or Analog or Digital Data Communication Access And Verification Control System" in the names of Ronald P. Sansone and Anthony F. Violante and Docket No. 08/577,361 filed herewith entitled "Cellular Telephone Manifest System" in the names of Ronald P. Sansone and Anthony F. Violante; Docket No. 08/575,782 filed herewith entitled "Metered Payment Cellular Telephone Communication, System" in the names of Gary G. Hansen, David W. Riley, David K. Lee, Frederick W. Ryan, Jr. Nathan Rosenberg, Anthony F. Violante and Ronald P. Sansone; and Docket No. 08/577,683 filed herewith entitled "A Method For Communicating With A Voice Response Unit Over A Cellular Telephone Network" in the names of Steve Kovlakas, Steven Vasquez, Jean-Hiram Coffy and Michael Wilson.

FIELD OF THE INVENTION

The invention relates generally to the field of telecommunications systems and more particularly to cellular telecommunications systems that utilize encryption and employ encrypted seed number signals.

BACKGROUND OF THE INVENTION

Cellular mobile radio or cellular telephone systems have been developed for mobile communications. Typically, the planned service area is divided into a number of geographical areas or cells. The available frequency channels for the service area are divided among the cells. A cellular telephone communicates with a nearby cell base station via one of the several radio frequency channels assigned to the cell. Conventional circuits link the base station to the mobile telecommunications switching office, which switches calls between the cellular telephone system and the rest of the telephone network.

Current cellular telephones gain access to the base station, by transmitting to the base station a series of numbers or characters, specific to the cellular telephone being used. The numbers or characters represent the telephone number of the cellular telephone being used and the manufacturer's identification number of the cellular telephone being used. The foregoing characters and numbers are checked at the base station to determine if the cellular telephone being used is allowed to use the base station selected and that the telephone number of the cellular telephone being used has the correct manufactures identification number. If the telephone number and manufacturer's identification number are found to be correct, the base station may further determine if the time elapsed and distance traveled by the cellular telephone from the last cellular telephone call are feasible. If, the cellular telephone traveled a feasible distance in the time elapsed from the last telephone call, the cellular telephone will be connected to the telephone network.

Unfortunately, people using off the shelf electronic receiving equipment are able to intercept and determine the telephone number and manufacturer's identification number of cellular telephones, while the telephone number and manufactures identification are being transmitted at specific radio frequencies to the base station. During, 1993 United States Cellular Telephone companies lost approximately three hundred ninety four million dollars ($394,000,000.00) from the unauthorized use of cellular telephone numbers and manufacturers identification numbers. It was estimated that the unauthorized use of cellular telephones cost United States Cellular telephone companies six hundred million dollars ($600,000,000.00) during 1994. If nothing is done to prevent the unauthorized use of cellular telephones, the above figure is expected to be higher each successive year.

SUMMARY OF THE INVENTION

This invention overcomes the disadvantages of the prior art by providing cellular telecommunications systems that utilize encryption and employ encrypted seed number signals to make it more difficult to make unauthorized cellular telephone calls.

DETAILED DESCRIPTION OF THE PREFERRED EMBODIMENT

Figure 1:
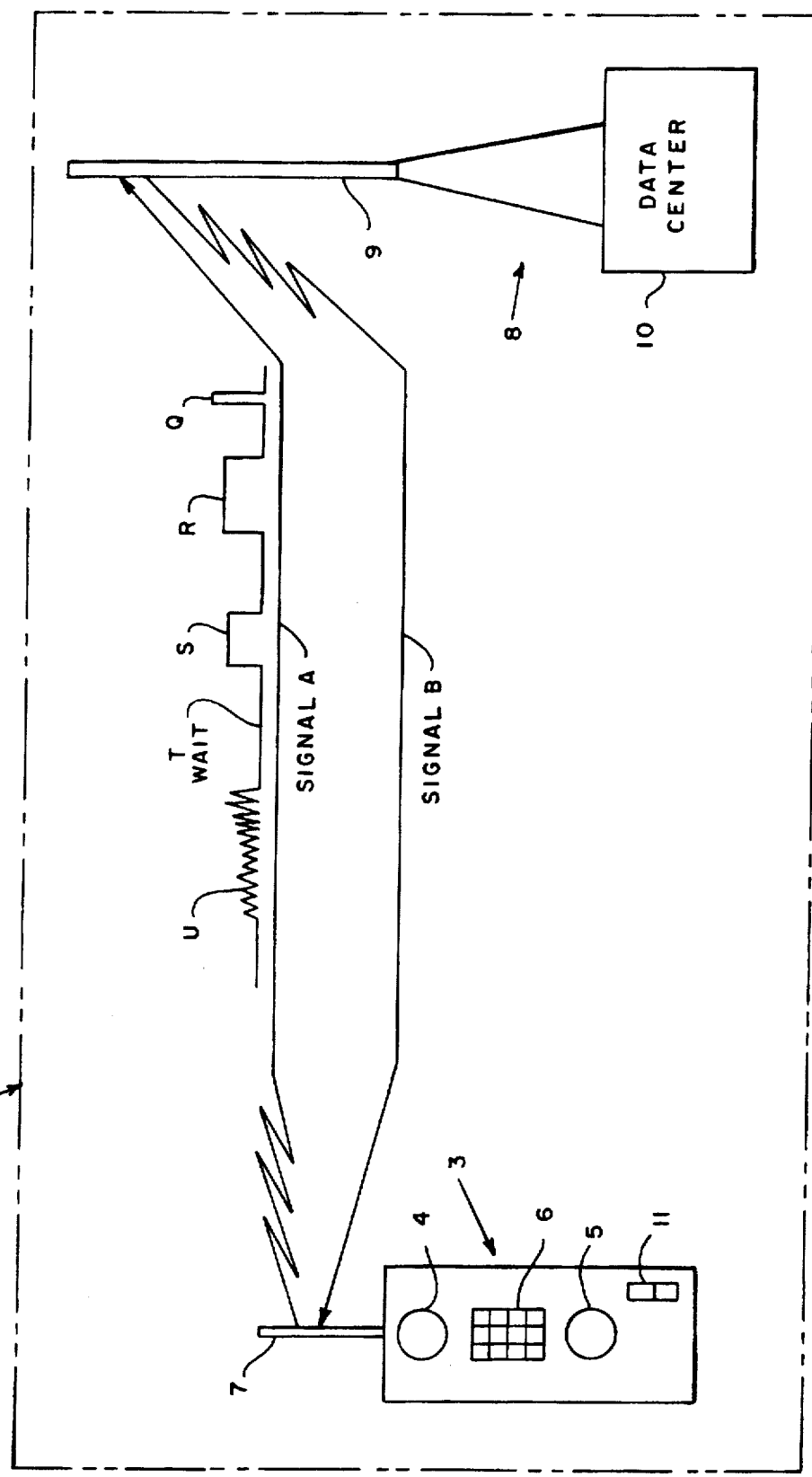
FIG. 1 is a drawing of a cellular telecommunications network that was utilized by the prior art.

In order to better understand that which separates this invention from the prior art consider the following. Refer to the drawings in detail, and more particularly to FIG. 1 a prior art cellular telecommunications network 2 is shown. Network 2 includes: a cellular telephone 3, that has a speaker 4, a mouthpiece 5, a keypad 6, an antenna 7, and a power switch 11; and a base station 8, that includes an antenna 9 and a data center 10.

When someone would want to place a telephone call on telecommunications network 2, they would activate power switch 11 and enter the telephone number they wish to call on keypad 6. Cellular telephone 3 will transmit signal A via antenna 7. Signal A has five components: Q; R; S; T; and U. Component Q contains handshake information to make cellular telephone compatible with base station 8 and component R contains the manufactures identification number for cellular telephone 3. Component S contains the telephone number of cellular telephone 3 and component T is a delay. Component U is the phone number entered into keypad 6. Signal A is received by antenna 9 and processed by data center 10. The foregoing characters and numbers are checked at base station 8 to determine if the cellular telephone being used is allowed to use the base station selected and that the telephone number of the cellular telephone being used has the correct manufactures identification number. If Signal A contains the correct information about cellular telephone 3 i.e., the telephone number and manufactures identification number are found to be correct, base station 8 further determines if the time elapsed and distance traveled by cellular telephone 3 from the last cellular telephone call are feasible. If components Q, R, S and T have been determined to be valid and if cellular telephone 3 traveled a feasible distance in the time elapsed from the last telephone call, component U is accepted by base station 8 and cellular telephone 3 is enabled. Cellular telephone 3 transmits signal B to antenna 7 and connects cellular telephone 3 to telephone communications network 2 to complete the connection.

Signal A is transmitted over specified radio frequencies and always contains the same fixed components Q, R, S, and T combined with a varying component U. Hence, Signal A may be intercepted by using conventional off the shelf electronic receiving equipment. Once Signal A is intercepted by a thief, Signal A can be used to make unauthorized cellular telephone calls. Even if a pin number or other identification number was added to signal A or signal B, the pin number or other identification number would still be broadcast in the open over the available radio frequencies. Thus, a thief would also be to determine the pin number or other identification number and make unauthorized cellular telephone calls.

Figure 2:
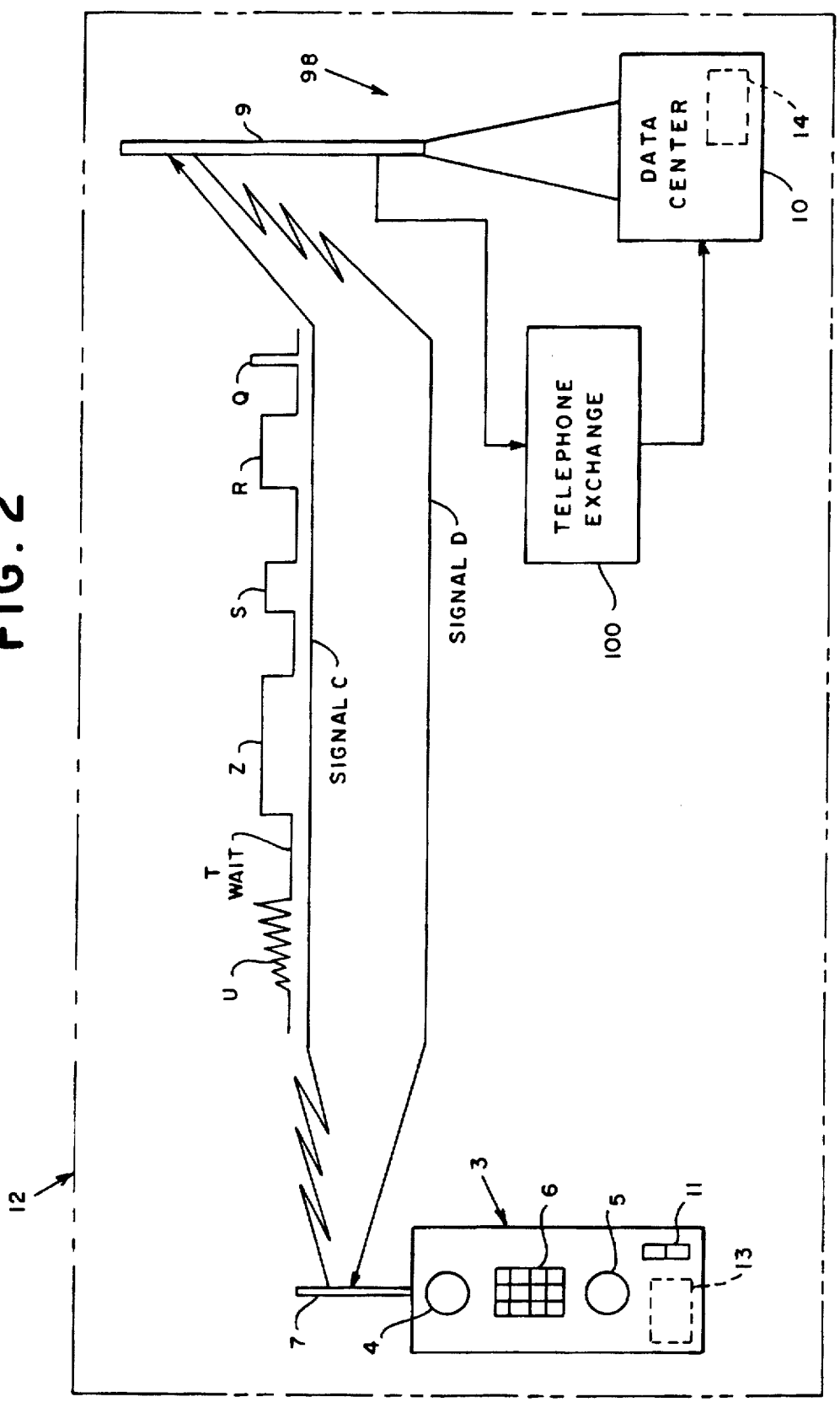
FIG. 2 is a drawing of the cellular telecommunications network of this invention.

FIG. 2 is a drawing of the cellular telecommunications network 12 of this invention. Network 12 includes: a cellular telephone 3, that has a speaker 4, a mouthpiece 5, a keypad 6, an antenna 7, a power switch 11 and a device 13 for encrypting component Z of Signal C (device 13 will be hereinafter described in the description of FIG. 3); a base station 98, that includes an antenna 9 and a data center 10 that includes a decryption device 14 (device 14 will be hereinafter described in the description of FIG. 4); and a telephone exchange 100.

When someone would want to place a telephone call on telecommunications network 12, they would activate power switch 11 and enter the telephone number they wish to call on keypad 6. Cellular telephone 3 will transmit Signal C via antenna 7. Signal C has six components: Q; R; S; Z; T; and U. Component Q contains handshake information to make cellar telephone 3 compatible with base station 98 and component R contains the manufactures identification number for cellular telephone 3. Component S contains the telephone number of cellular telephone 3 and component Z contains an encrypted message that changes from transmission to transmission. Component Z will be more fully described in the description of FIGS. 3 and 4. Component T is a delay and component U is the phone number entered into keypad 6. Signal C is received by antenna 9 and processed by data center 10. The foregoing transmitted characters and numbers are checked at base station 98 to determine if cellular telephone 3 is allowed to use the base station selected and that the telephone number of the cellular telephone being used has the correct manufactures identification number. If Signal A contains the correct information about cellular telephone 3 i.e., the telephone number and manufactures identification number are found to be correct, the base station 98 further determines if the time elapsed and distance traveled by cellular telephone 3 from the last cellular telephone call are feasible. If, cellular telephone 3 traveled a feasible distance in the time elapsed from the last telephone call, device 14 reads component Q. If component Q contains the correct information, base station 98 transmit Signal D to antenna 7 and connects cellular telephone 3 to telephone communications network 12, via telephone exchange 100.

Signal C is transmitted over specified radio frequencies and always contains different information, component Z will always have different information. Hence, even if Signal C is intercepted by conventional off the shelf electronic receiving equipment. Signal C would not be able to be used by a thief to make another unauthorized cellular telephone calls.

Figure 3:
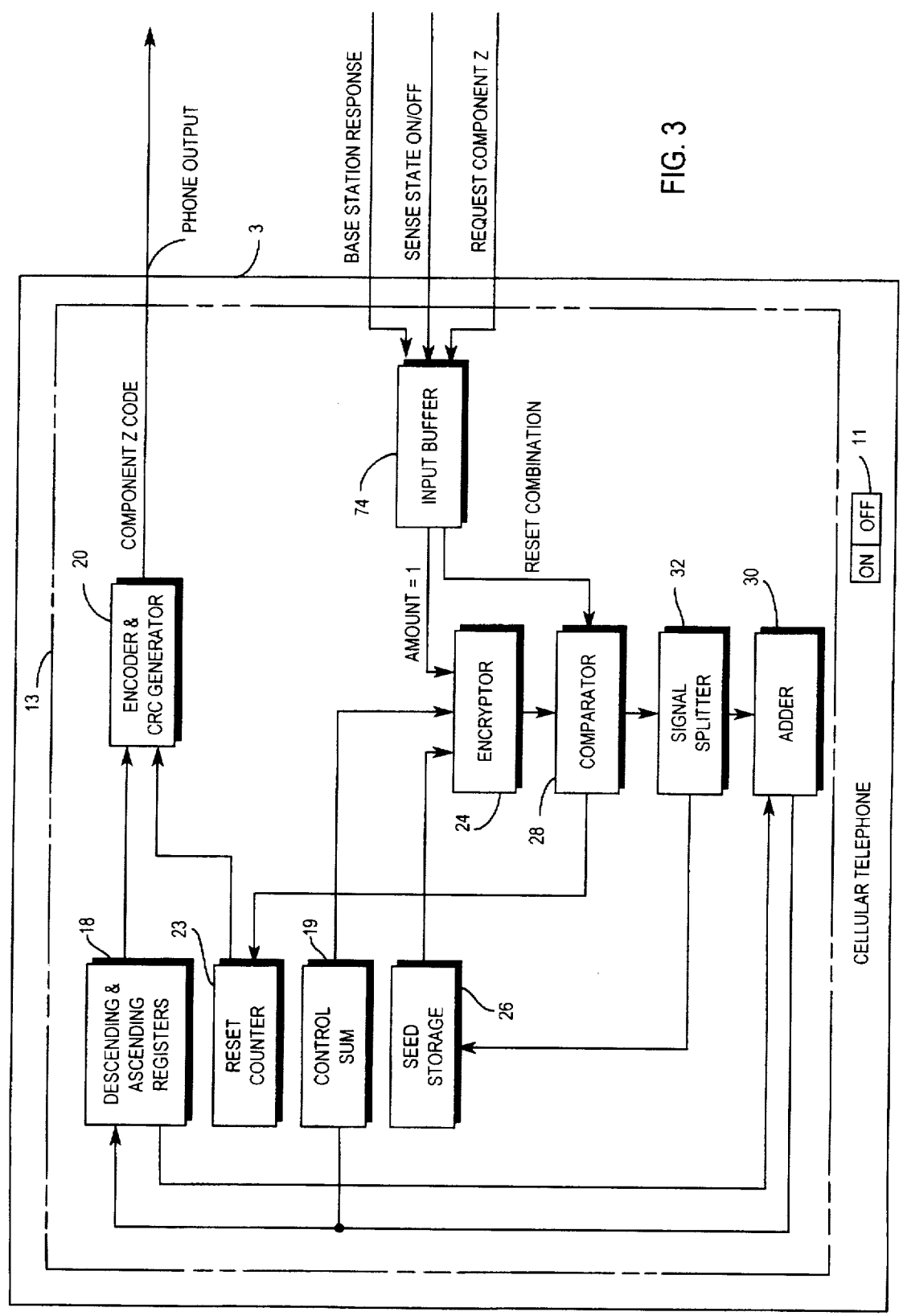
FIG. 3 is a block drawing of the cellular phone portion of the apparatus of this invention.

FIG. 3 is a block drawing of the cellular phone portion of the apparatus of this invention. Encryption device 13 includes: descending and ascending registers 18; reset counter 23; control sum 19; seed storage 26; encoder and cyclical redundancy character generator 20; encryptor 24; comparator 28; signal splitter 32; adder 30; and input buffer 74.

Register 18 contains an ascending and descending register. Register 18 is coupled to an encoder and cyclical redundancy character generator 20 as is reset counter 23. Encoder and cyclical redundancy character generator 20 operates upon the information from register 18 and from the reset counter 23 to generate an authorization code (component Z of Signal C). Component Z is sent to the output of cellular phone 3 and transmitted to base station 8. How are components Q, R, S, T and U are buffered and sent to base station 98 by the currently used cellular telephone processes known to those skilled in the art.

The authorization code is utilized in conjunction with the remote resetting of device 14 in communication with base station 98 (shown in FIG. 4), the base station 98 may be accessed by device 14 over an insecure radio frequency.

The authorization code provides a level assurance that information has been accurately transferred between user of cellular telephone 3 and base station 98. Encoder and cyclical redundancy character generator 20 are of the type which process information to provide a detection scheme for errors which may occur in transferring information.

When power switch 11 of cellular phone 3 is turned on, a amount equal to one (1) is entered by cellular phone 3 at input buffer 74. The amount is applied to an encryptor 24. Additionally, applied to the encryptor 24 is information from the control sum register 19, and a presorted seed number signal from seed storage 26. The seed number signal is stored in an unencrypted form. Encryptor 24 can be any one of a large number of encrypting devices including those devices which use the Data Encryption Standards described in FIPS PUB 46, dated Jan. 15, 1977 and published by the United States Department Of Commerce, National Bureau of Standards, herein incorporated by reference. In addition, a standard encryption scheme, such as the RSA encryption technique, can also be used for encryptor 24. It will be obvious to one skilled in the art that different public and private encryption keys may be utilized. Encryptor 24 generates an encrypted signal based upon the amount equal to one (1) received from input buffer 74, the information from control sum register 19 and the seed number signal from seed storage register 26. The output signal of encryptor 24 is applied to a comparator 28. Comparator 28 compares the signal generated by encryptor 24 with a signal received from base station 98 via input buffer 74.

If comparator 28 determines that the entered combination coincides with the combination generated by encryptor 24, comparator 28 generates a signal to signal splitter 32. Signal splitter 32 transmits a signal to seed storage 26 and adder 30. Seed storage 26 would typically store numbers having from 6 to 128 digits. It would be obvious to one skilled in the art that additional digits may be utilized by seed storage 26. The output of adder 30 is applied to increment the descending register in descending and ascending registers 18 and increment control sum 19. A successful comparison by comparator 28 also causes a new seed number to be stored in seed storage 26 for the next phone call. Seed storage 26 will transmit the new seed number to encryptor 24 for the next phone call.

Reset counter 23 is incremented by the output of comparator 28 only when comparator 28 has a successful comparison. Reset counter 23 may be one of many types including a modulo 2 or modulo 16 counter. Counter 23 provides an input signal to encoder and cyclical redundancy character generator 20 such that the authorization code signal (component Z of Signal C) contains information as to whether device 13 has been successfully reset.

Figure 4:
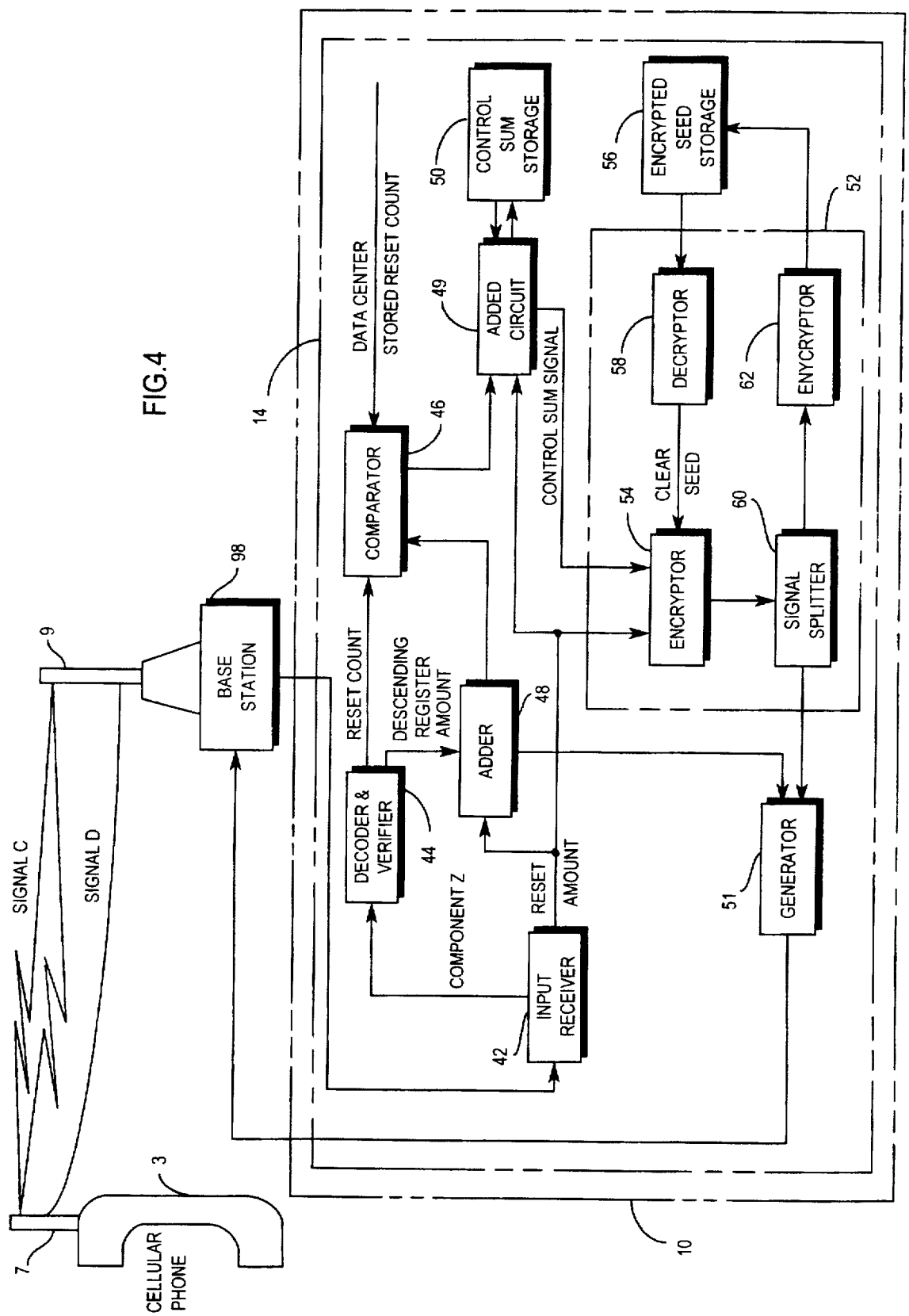
FIG. 4 is a block drawing of the cellular base station portion of the apparatus of this invention.

FIG. 4 is a block drawing of the cellular base station 98 portion of the apparatus of this invention receiving a phone call from cellular phone 3 via antenna 7. Antenna 7 transmits Signal C (shown in FIG. 2) to antenna 9 of base station 98. Data center 10 includes device 14. Device 14 receives and process component Z of Signal C from base station 98. Component Z of Signal C is received by an input receiver 42 and coupled to a decode and verify 44.

Decode and verify 44 decodes component Z of Signal C to generate the reset count and the descending register amount. Decoder 44 further verifies the cyclical redundancy characters to insure that the data has been accurately transmitted. The reset count signal is applied to comparator 46 wherein the decoded reset count signal is compared to the reset count signal stored in decoder and verifier 44. The decoded descending register amount signal is applied to an adder 49 with the reset amount signal from receiver 42. The output of adder 48 is coupled to comparator 46. If the reset count signal from decode and verifier 44 compares correctly with the output of adder 49, comparator 46 enables an adder circuit 49. Adder circuit 49 is coupled to control sum storage register 50 to provide the current control sum.

The physically sealed unit 52 is sealed in a manner to prevent access to the circuitry by base station 98 or data center 10 personnel. The sealed unit 52 results in enhanced security for the validation of component Z of Signal C because the base station and data center personnel do not have access to the encryption circuit and certain unencrypted data associated with the resetting of cellular phone 3.

The control sum signal from adder 49 is applied to an encryptor 54 within sealed unit 52 as is the reset amount from input receiver 42. Additionally applied to encryptor 54 are unencrypted seed number signals. The encryptor 54 may be any one of a large number of encrypting devices such as those employing the data encryption standard previously identified. However, it should be noted that encryptor 54 is identical in its operation to encryptor 24 contained within cellular phone 3.

The seed number signal applied to encryptor 54 is stored in data center 10 so that it may be accessible by data center personnel. However, the seed number signal is stored in an encrypted form in encrypted seed storage 56. This is the only form of the seed signal to which data center personnel have access. The encrypted seed signal from encrypted seed storage 56 is applied to decryptor 58. Decryptor 58 need not be similar to or compatible with the form of encryption provided by encryptor 54 and encryptor 24 (FIG. 3) in cellular phone 3. Decryption device 58 may be any one of the large number of devices available to decrypt the encrypted seed number signal and to provide an unencrypted, clear seed number signal which is the same as the seed number signal stored in seed storage 26 (FIG. 3) of cellular phone 3. Encryptor 54 generates an encrypted output signal which is applied to signal splitter 60. Signal splitter 60 splits the encrypted output signal from encryptor 54 into a first signal which is transmitted via generator 51 to base station 98. Antenna 9 of base station 98 transmits the above first signal as Signal D to input buffer 74 (FIG. 3) of cellular phone 3.

Splitter 60 additionally applies part of the encrypted output signal from encryptor 54 to encryptor 62 to generate a new encrypted seed number signal. Encryptor 62 encrypts the seed number signal in a manner so that it is compatible with the decryptor 58. The new encrypted seed number signal is transmitted from within the sealed unit 52 to the encrypted seed storage 56 which is accessible to the data center personnel.

Figure 5:
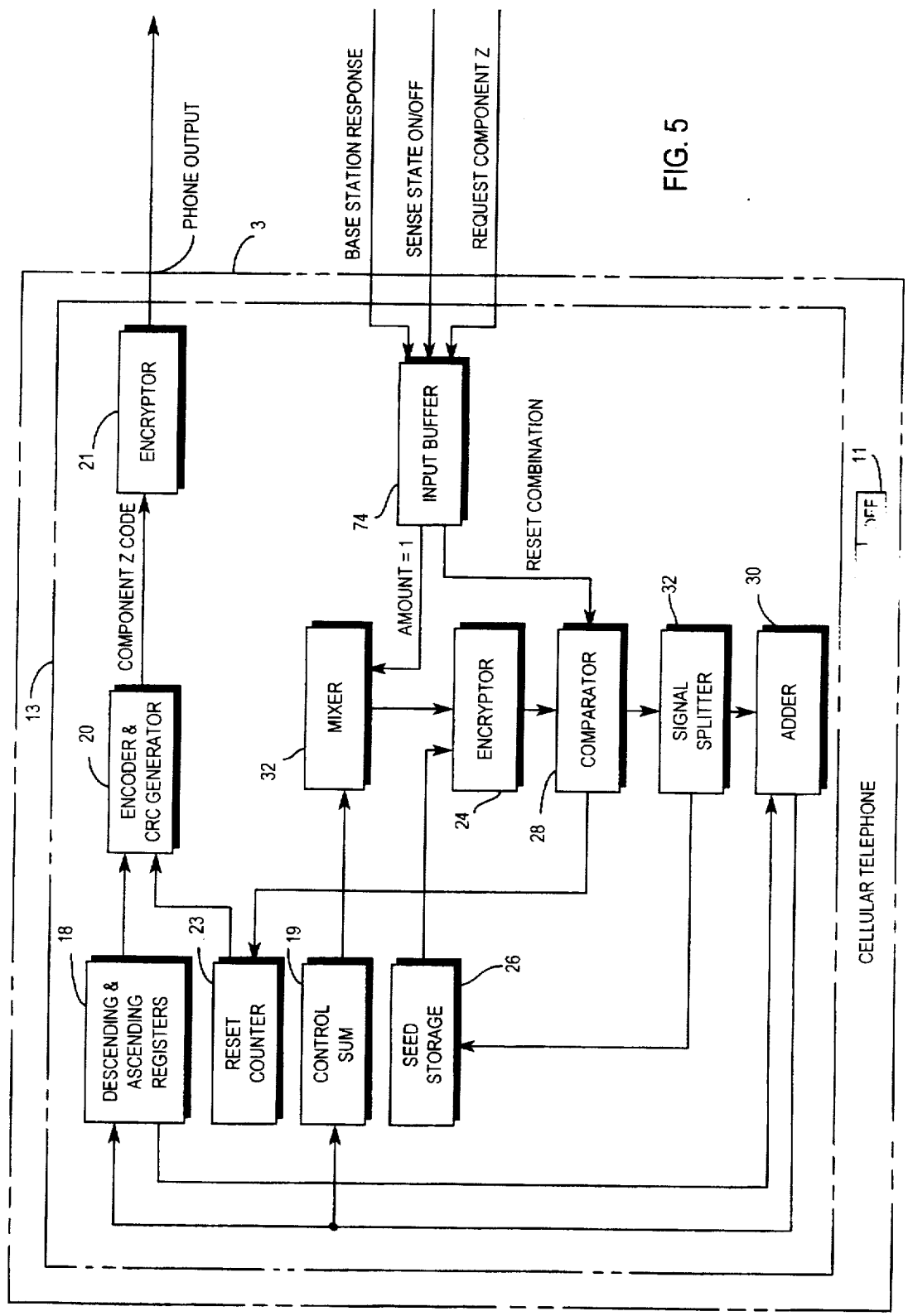
FIG. 5 is a block diagram of the cellular phone portion of the apparatus of this invention in accordance with FIG. 3 including a second encryptor and mixer to enhance the security of the system.

FIG. 5 is a block diagram of the cellular phone portion of the apparatus of this invention in accordance with FIG. 3 including a second encryptor 21 and mixer 32 to enhance the security of the system. The reset amount=1 from input buffer 74 and the output from control sum 19 are applied to mixer 32 before being applied to encryptor 24. Mixer 32 provides additional security for cellular phone 3 by providing a mixed input signal to encryptor 24 so that it will be more difficult to determine the output of encryptor 24. Encryptor 21 provides additional security for cellular phone 3 by further encrypting the output of encode and CRC generator 20 i.e., component Z of Signal C.

Figure 6:
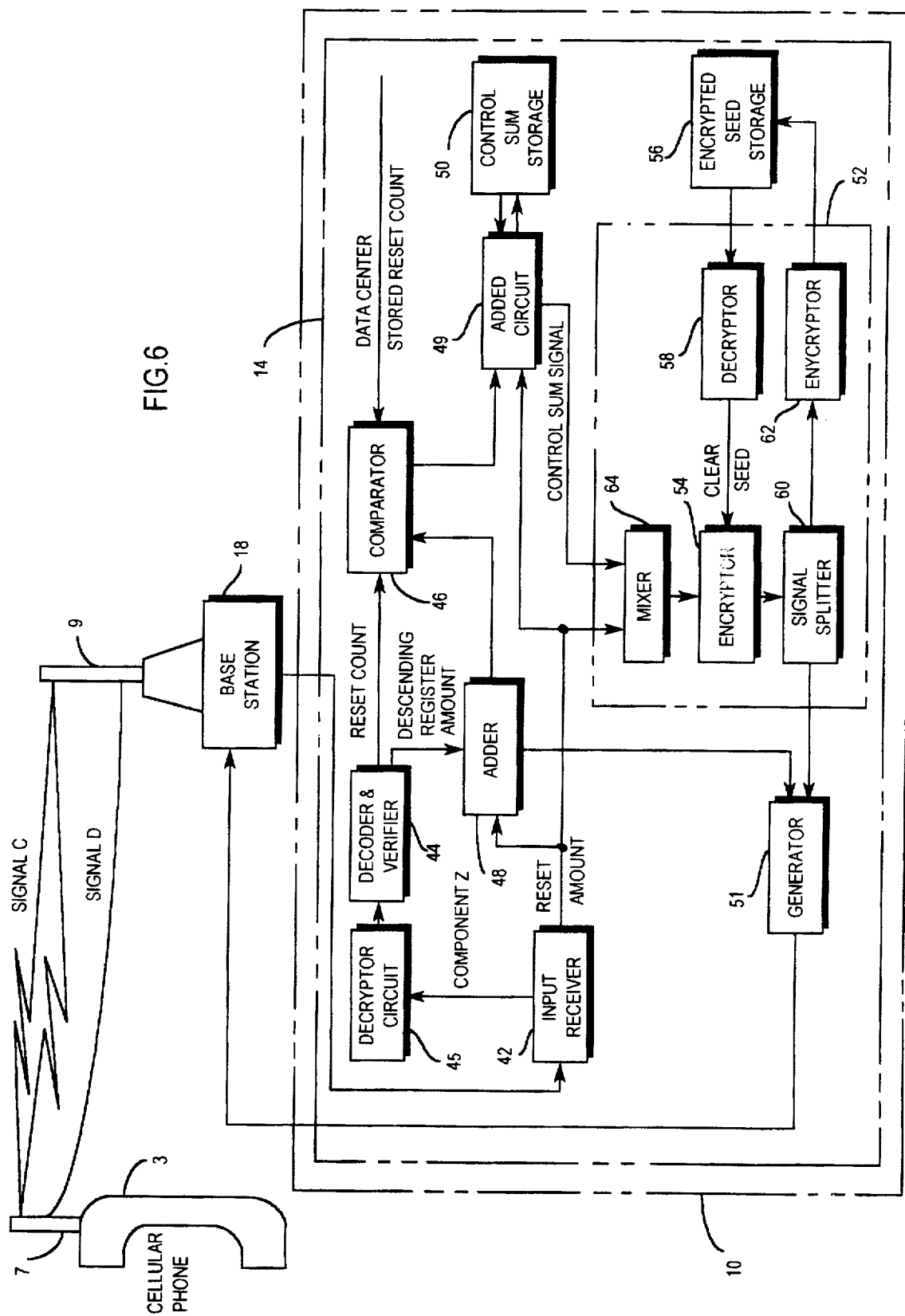
FIG. 6 is a block diagram of the cellular base station portion of the apparatus of this invention in accordance with FIG. 4 including a second decryptor and mixer to enhance the security of the system.

FIG. 6 is a block diagram of cellular base station 98 portion of the apparatus of this invention in accordance with FIG. 4 including a second decryptor circuit 45 and a mixer 64 to enhance the security of the system. Mixer 64 is located within sealed unit 52. Mixer 64 provides further enhanced security similar to that provided by mixer 32 to cellular phone 3. If a mixer 32 is provided in cellular phone 3, a like mixer 64 must be provided at data center 10. The input of decryption circuit 45 is coupled to the output of input receiver 42 and the output of decryption circuit 45 is coupled to the input of decoder and verifier 44. Decryption circuit 45 decrypts the portion of the signal encoded by encryptor 21 (FIG. 5).

The above specification describes a new and improved cellular telecommunications systems that utilizes encryption and employs encrypted seed number signals to make it more difficult to make unauthorized cellular telephone calls. It is realized that the above description may indicate to those skilled in the art additional ways in which the principles of this invention may be used without departing from the spirit. It is, therefore, intended that this invention be limited only by the scope of the appended claims.

What is claimed is:

1. A system for determining authorized cellular telephone communications between one or more cellular telephones and a base station and connecting the authorized cellular telephone communications to a telecommunications network, said system comprising:

means contained within the cellular telephone for generating a number;

an encrypted seed storage resister containing one or more seed numbers, said register is contained within the cellular telephone coupled to said generating means for generating a new encrypted number based upon the seed after a call has been completed, that is unique to the cellular telephone containing said register;

means coupled to the base station for receiving the encrypted number generated by said means;

an encryptor whose input is coupled to said means for generating a number and said seed register, said encryptor encrypts its inputs; and means coupled to said encryptor for processing the encrypted number;

means contained within the base station for generating a number;

an encrypted seed storage register containing one or more seeds, said register is contained within the base station coupled to said generating means for generating a new encrypted number based upon the seed after a call has been completed, that is unique to the cellular telephone communicating with the base station;

means contained within the base station for comparing the encrypted number generated by said means contained within the cellular telephone with the encrypted number generated by said means contained within the base station, so that if the encrypted number generated by said means contained within the cellular telephone is the same as the encrypted number generated by said means contained within the base station, the cellular telephone is connected to the network to complete a call;

wherein said means for processing the encrypted number comprises:

an input buffer containing a set of stored numbers received from the base station; the output of said input buffer is coupled to said encryptor;

means coupled to the output of said input buffer and the output of said encryptor for comparing the output of said input register with the output of said encryptor;

a reset counter coupled to the output of said comparing means, said reset counter is incremented by the output of said comparing means only when said comparing means has a successful comparison between the output of said reset counter and said encryptor;

a signal splitter coupled to the output of said comparing means, said signal splitter has two outputs only when said comparing means has a successful comparison, the first output of said signal splitter is coupled to said seed storage; and an adder whose input is coupled to the second output of said signal splitter.

2. The system claimed in claim 1, wherein said means for generating a number comprises:

an ascending and descending register, whose input is coupled to the output of said adder, the output of said adder increments the descending register;

a control sum register whose input is coupled to the output of said adder, the output of said adder increments the control sum, the output of said control sum register is coupled to said encryptor; and an encoder and cyclical redundancy character generator whose input is coupled to the output of said reset counter and the output of said ascending and descending register, said encoder and cyclical redundancy character generator produces an encrypted signal.

3. The system claimed in claim 2, further including:

a mixer whose inputs are coupled to the output of said control sum register and said input buffer, the output of said mixer is coupled to the input of said encryptor so that it will be more difficult to determine the output of said encryptor.

4. The system claimed in claim 2, further including:

a second encryptor whose input is coupled to the output of said encoder and cyclical redundancy character generator to provide additional security by further encrypting the output of said encoder and cyclical redundancy character generator.

5. The system claimed in claim 1, wherein said means for receiving the encrypted number is an input receiver.

6. The system claimed in claim 5, wherein said means contained within the base station for generating an encrypted number comprises:

a decryptor whose input is coupled to the output of said encrypted seed storage register;

a first encryptor whose input is coupled to said means for generating a number and said decryptor, said encryptor encrypts its inputs;

a signal splitter whose input is coupled to the output of said first encryptor, said signal splitter has two outputs, the first output is coupled to said generating means; and a second encryptor whose input is coupled to the second output of said signal splitter and whose output is coupled to said encrypted seed storage register, said second encryptor encrypts the number for subsequent usage.

7. The system claimed in claim 5, wherein said means contained within the base station for generating an encrypted signal is contained in a physically sealed housing to prevent unauthorized access to the components of said means by base station or data center personnel.

8. The system claimed in claim 1, wherein said means contained within the cellular telephone for generating a number and said encrypted seed storage register is contained in a physically sealed housing to prevent unauthorized access to the components of said means.

9. The system claimed in claim 6, wherein said means for generating the encrypted number comprises:

a decoder and verifier whose input is coupled to the output of said input receiver, said decoder and verifier decodes the encrypted number received by said input receiver, the output of said decoder is coupled to the input of said comparing means;

a first adder whose inputs are coupled to the output of said input receiver and said decoder and verifier, said adder adds its inputs, the output of said adder is coupled to said comparing means;

a control sum storage that provides a cyclically updated calculated value; and a second adder whose inputs are coupled to the output of said control sum storage, said comparing means and said input receiver, said second adder provides an output to said first encryptor and updates said control sum storage in a cyclical manner.

10. The system claimed in claim 9, further including:

a mixer whose inputs are coupled to the output of said second adder and said input receiver, the output of said mixer is coupled to the input of said first encryptor so that it will be more difficult to determine the output of said first encryptor.

11. The system claimed in claim 9, further including:

a second decryptor whose input is coupled to the output of said input receiver and whose output is coupled to the input of said decoder and verifier, said second decryptor provides additional security by further decrypting the output of said input receiver.

* * * * *